April 13, 1926.
A. E. JAMES
1,580,253
OIL BURNING STOVE
Filed Dec. 29, 1924
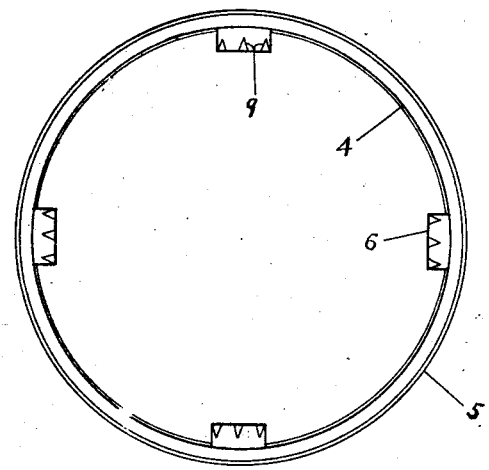
Fig. I.
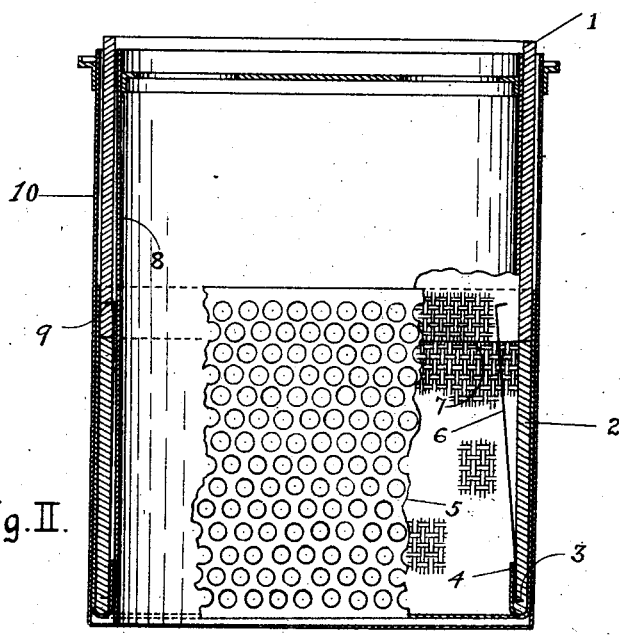
Fig. II.
*Albert E. James*
INVENTOR.

Patented Apr. 13, 1926.

1,580,253

UNITED STATES PATENT OFFICE.

ALBERT E. JAMES, OF NATCHEZ, MISSISSIPPI.

OIL-BURNING STOVE.

Application filed December 29, 1924. Serial No. 758,633.

*To all whom it may concern:*

Be it known that I, ALBERT E. JAMES, a citizen of the United States, residing at Natchez, in the county of Adams and State of Mississippi, have invented a new and useful Improvement in Oil-Burning Stoves, of which the following is a specification.

My invention relates to improvements in oil-burners for stoves, and it especially relates to improvements in the type using a tubular-form wick in combination with a perforated sheet-metal wick-carrier attached thereto, and having means operable to raise and lower said carrier and wick, and the objects of my improvement are, first, to reduce the cost of re-wicking when wicks have been burned out; second, to provide novel means whereby a new wick may be readily inserted; third, to provide a short sub-wick in combination with the perforated metal wick-carrier; fourth, to provide a short super-wick; fifth, to provide a plurality of toothed spring grippers that automatically lock the super-wick and sub-wick together.

I attain these objects by the means illustrated in the accompanying drawings, in which:

Figure 1 is a plan view, and

Figure 2 is a vertical sectional view on center line of the burner, and a fractional view of the wick-carrier and wicks.

The designating numerals in Fig. 2 are disposed in orderly progression to facilitate descriptive reference, similar numerals in Fig. 1 indicating corresponding parts.

Referring to the drawings:

Member 5 is a perforated sheet-metal wick-carrier in which a short sub-wick 2 is secured by the upturned portion 4. Resting upon sub-wick 2 is a short super-wick 1 which is held securely in contact with the sub-wick by means of a plurality of springs 6 having a series of hooks 9 and 3 formed on each end thereof and shown embedded in wicks 1 and 2. These hooked springs 6 are shown in Fig. 1 in the position they normally assume when the wick-carrier 5 has been removed from the burner casing 10 and the remnant of wick 1 removed when renewal becomes necessary. Then a new super-wick may be placed with its lower edge in contact with the upper edge of sub-wick 2 as shown at 7 and the carrier and wicks lowered into the burner, when the inner casing 8 will force the springs 6 into contact with the wicks and embed the hooks 9 in wick 1 as shown in Fig. 2 at 9.

Thus, through my improvement, renewal of burned-out wicks is easily accomplished and at much less expense, as the wick-carrier 5 and sub-wick 2 are a permanent part of the stove, it only being necessary to purchase the short super-wicks as shown at 1.

From the foregoing description I believe that the advantages and novel features of my invention will be clearly apparent.

I desire it to be understood that I may make changes in the construction, design and combination of the several parts of this invention, provided that such changes fall within the scope and spirit of the appended claims.

What I claim as new and desire to secure by Letters Patent is as follows:—

1. The combination in an oil-burning stove, of a wick-carrier, a short sub-wick secured in said wick-carrier, a plurality of hook-bearing springs disposed within and securely fastened to said wick-carrier, and a short super-wick secured in contact with the upper edge of said sub-wick by means of said hook-bearing springs.

2. The combination in an oil-burning stove, of a wick-carrier, a short sub-wick secured in said wick-carrier, a plurality of hook-bearing springs disposed within and securely fastened to said wick-carrier, a short super-wick secured in contact with the upper edge of said sub-wick by means of said hook-bearing springs, a tubular-form burner having an outer casing, an inner casing attached to said outer casing at the lower end thereof, said inner casing operating to embed the hooks on upper ends of said springs into said super-wick and retain them in said position.

3. The combination in an oil-burning stove, of a wick-carrier, a sub-wick secured in said wick-carrier, a super-wick supported by said sub-wick, a plurality of hook-bearing members disposed within and attached to said wick-carrier for securely holding said super-wick in contact with said sub-wick.

4. The combination in an oil-burning stove, of a tubular-form burner comprising an outer member, an inner member spaced apart therefrom, a spacing member secured between said tubular members at their lower ends and forming an annular fuel chamber, a wick-carrier adapted to operate within said fuel chamber, a sub-wick secured in said wick-carrier, a super-wick secured above said sub-wick and in end to end contact therewith.

5. In combination with a burner having a feed tube and an inner tube, a primary wick located between said tubes, a series of clips positioned against the inner surface of said wick so as to slide against the outer surface of the inner tube, and prongs carried by the upper ends of said clips for engagement with a secondary wick.

6. In a center feed burner, a primary wick, clips positioned against the inner surface of said work, said clips having prongs, a secondary wick with which said prongs are adapted to engage, and means for forcing said prongs into and out of engagement with said secondary wick.

7. In combination with a center feed burner having a feed tube and an inner tube, said feed tube having an upturned edge, clips secured to said upturned edge, prongs carried by the upper ends of the clips for engagement with a secondary wick, said prongs being of spring metal so as to bow outward when passing above the upper edge of the inner tube.

8. In combination with a center feed burner having a feed tube and an inner tube, a primary wick located between said tubes, a series of spring clips having prongs formed upon both ends thereof, the prongs upon the lower ends adapted to engage with the primary wick and the prongs upon the upper edge adapted to engage with the secondary wick, and means for engaging and disengaging said prongs.

In testimony whereof I have affixed my signature.

ALBERT E. JAMES